United States Patent
Heim et al.

(10) Patent No.: US 7,927,018 B2
(45) Date of Patent: Apr. 19, 2011

(54) WHEEL BEARING ARRANGEMENT COMPRISING AN ENCODER

(75) Inventors: Jens Heim, Bergrheinfeld (DE); Jon Hamilton, Kitchener (CA)

(73) Assignee: Schaeffler KG (DE)

( * ) Notice: Subject to any disclaimer, the term of this patent is extended or adjusted under 35 U.S.C. 154(b) by 693 days.

(21) Appl. No.: 11/908,886

(22) PCT Filed: Mar. 9, 2006

(86) PCT No.: PCT/DE2006/000423
§ 371 (c)(1),
(2), (4) Date: Dec. 21, 2007

(87) PCT Pub. No.: WO2006/097072
PCT Pub. Date: Sep. 21, 2006

(65) Prior Publication Data
US 2008/0166079 A1    Jul. 10, 2008

Related U.S. Application Data

(60) Provisional application No. 60/663,355, filed on Mar. 18, 2005.

(51) Int. Cl.
*F16C 32/00* (2006.01)
*F16C 33/76* (2006.01)
(52) U.S. Cl. ......................... 384/448; 384/484
(58) Field of Classification Search .............. 384/448, 384/484–486; 324/207.25
See application file for complete search history.

(56) References Cited

U.S. PATENT DOCUMENTS

| | | | | |
|---|---|---|---|---|
| 4,948,277 A * | 8/1990 | Alff | ............................ | 384/448 |
| 4,968,156 A * | 11/1990 | Hajzler | ............................ | 384/448 |
| 5,195,830 A * | 3/1993 | Caillault et al. | ............... | 384/448 |
| 5,431,413 A * | 7/1995 | Hajzler | ............................ | 384/448 |
| 5,470,157 A * | 11/1995 | Dougherty et al. | .......... | 384/448 |
| 5,969,518 A * | 10/1999 | Merklein et al. | .............. | 384/448 |
| 6,045,133 A * | 4/2000 | Lannert et al. | ............... | 384/448 |
| 6,605,938 B1 * | 8/2003 | Sentoku et al. | ............... | 384/448 |
| 6,637,754 B1 | 10/2003 | Ohtsuki et al. | | |
| 6,994,472 B2 * | 2/2006 | Inoue | ............................ | 384/448 |

\* cited by examiner

*Primary Examiner* — Thomas R Hannon
(74) *Attorney, Agent, or Firm* — Ostrolenk Faber LLP

(57) ABSTRACT

The invention relates to a wheel bearing arrangement comprising an encoder arranged in a radial annular region between an inner part and an outer part.

8 Claims, 6 Drawing Sheets

WHEEL BEARING ARRANGEMENT COMPRISING AN ENCODER

CROSS REFERENCE TO RELATED APPLICATION

The present application is a 35 U.S.C. §§371 national phase conversion of PCT/DE2006/000423, filed Mar. 9, 2006, which claims priority of United States Provisional Patent Application No. 60/663,355, filed Mar. 18, 2005, the disclosure of which has been incorporated herein by reference. The PCT International Application was published in the German language.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

1. Description of Related Art

Such a wheel bearing arrangement is described in more detail in U.S. Pat. No. 6,637,754 B1. The encoder is fixed to a sheet metal plate which is generally angular. In this context, the encoder is formed by an elastomer body which is, for example, bonded onto the sheet metal plate by vulcanization. The elastomer of the encoder has magnetizeable particles dispersed through it. This magnetizeable structure is magnetized to the finished encoder with alternating polarization. As a result of the magnetization, the encoder has an annular section about the rotational axis which is alternately encoded in certain sections with north and south polarization. Accordingly, the annular section is divided into individual sections which are adjacent to one another at the circumference, each of which sections has a different polarization from the adjacent section. The sensor is oriented axially in such a way that the signals can be read by a sensor from an axial direction which is directed in the same way as the rotational axis. The reading part of the sensor accordingly lies axially opposite the encoder.

2. Field of the Invention

The present invention relates to a wheel bearing arrangement in which an encoder is arranged in a radial annular space between an inner part and an outer part.

The quality with which the signals are read by the signals of the encoder depends on the quality of the distance of the sensor from the encoder. The smaller the possible tolerances of the distance, the better the quality of the signals. Particles of dirt in the gap, in particular magnetizeable or magnetic particles of dirt, falsify the reading result.

The appearance of technical arrangements in sporty vehicles and luxury vehicles and in particular in two-wheeled vehicles is particularly important for customers. The appearance of an elastomer encoder which has been operated over a relatively long time can be disadvantageous for a viewer.

BRIEF SUMMARY OF THE INVENTION

The object of the invention is to provide a simple and cost-effective wheel bearing arrangement with which the above-mentioned disadvantages are avoided.

The wheel bearing arrangement has the features described below:

An encoder is arranged in a radial annular space between an inner part and an outer part. The outer part is optionally an outer ring of a wheel bearing or a housing and is preferably connected in a rotationally fixed fashion to a vehicle wheel. At least one raceway for at least one series of rolling bodies is formed at least in the outer ring. The outer part is supported on the inner part by means of rolling bodies and is mounted on the inner part so as to be rotatable about the rotational axis. The inner part is an inner ring of a wheel bearing with at least one raceway or is a bolt or the like on which a vehicle wheel is rotatably mounted.

The encoder is directed axially away from rolling bodies of the wheel bearing arrangement toward a sensor which is arranged axially behind a rotationally fixed protective plate. The protective plate is rotationally fixed with respect to the inner part.

The protective plate covers the annular space of the wheel bearing arrangement at least partially in an axial direction with the rolling bodies.

The encoder is thus arranged in the radial interior of the wheel bearing and is covered axially by the protective ring. The protective ring closes off the bearing interior from the outside. The wheel bearing gives a viewer a better impression, in particular if the appearance of the protective ring is intentionally improved through design features, coatings or corresponding coloring. Such design features are advantageous, for example, in the case of wheel bearing arrangements for motorcycles.

The protective ring is preferably a ring made of sheet metal which is of an L-shaped configuration in longitudinal section when viewed along the rotational axis. When a magnetically polarized encoder is used, the protective ring is composed of a nonmagnetizeable material, preferably of a stainless steel.

The sensor is either arranged spaced axially apart from the protective plate or bears directly against the protective plate. In this context, the housing of the sensor can also bear directly against the protective plate and the actual reading part of the sensor can be spaced apart from the protective plate. It is important, however, in this case that between the sensor and the sensor housing there should be no gap formed which becomes blocked with destructive particles of dirt.

The encoder is closed off from the outside by the protective ring to prevent soiling. Between the stationary protective ring and the rotationally moveable outer part an annular sealing gap is formed. As an alternative to this, the protective ring is at the same time the carrier of one or more elastic sealing lips which bear against the outer part in a seal-forming fashion.

The encoder is preferably composed of a plastic or of an elastomer or of some other material which can be magnetically encoded per se or by adding magnetizeable additives. The carrier for the encoder is preferably an angular ring made of any suitable material, preferably sheet metal. The encoder is preferably bonded onto the carrier, for example by vulcanization.

According to refinements of the invention, the carrier of the encoder is additionally sealed off from the inside or the outside by means of one or more sealing lips which bear in a seal-forming fashion against the inner part or which are spaced apart from the inner part with a sealing gap. The sealing lip is either formed separately from the encoder or is formed in one part with the encoder from the preferably elastic material. In the latter case, the sealing lip which is composed of the elastic material is provided, like the annular section, with magnetizeable additives, or in contrast to the annular section it is not provided with magnetizeable additives.

One refinement of the invention provides that in the new state in the wheel bearing arrangement the sealing lip bears with radial prestress in a seal-forming fashion against the inner part or against a limb of the protective ring. After a predictable operating time, the magnetizeable elastic material is then worn in seal-forming contact to such an extent that an optimum, contactless sealing gap with a minimum gap thickness is produced.

DETAILED DESCRIPTION OF THE INVENTION

The invention is described in more detail below with reference to the drawings. The illustrations according to FIGS. 1 to 6 are all partial illustrations or details of a wheel bearing arrangement and alternative embodiments in the longitudinal section along the rotational axis of the wheel bearing arrangement.

Figure 1:
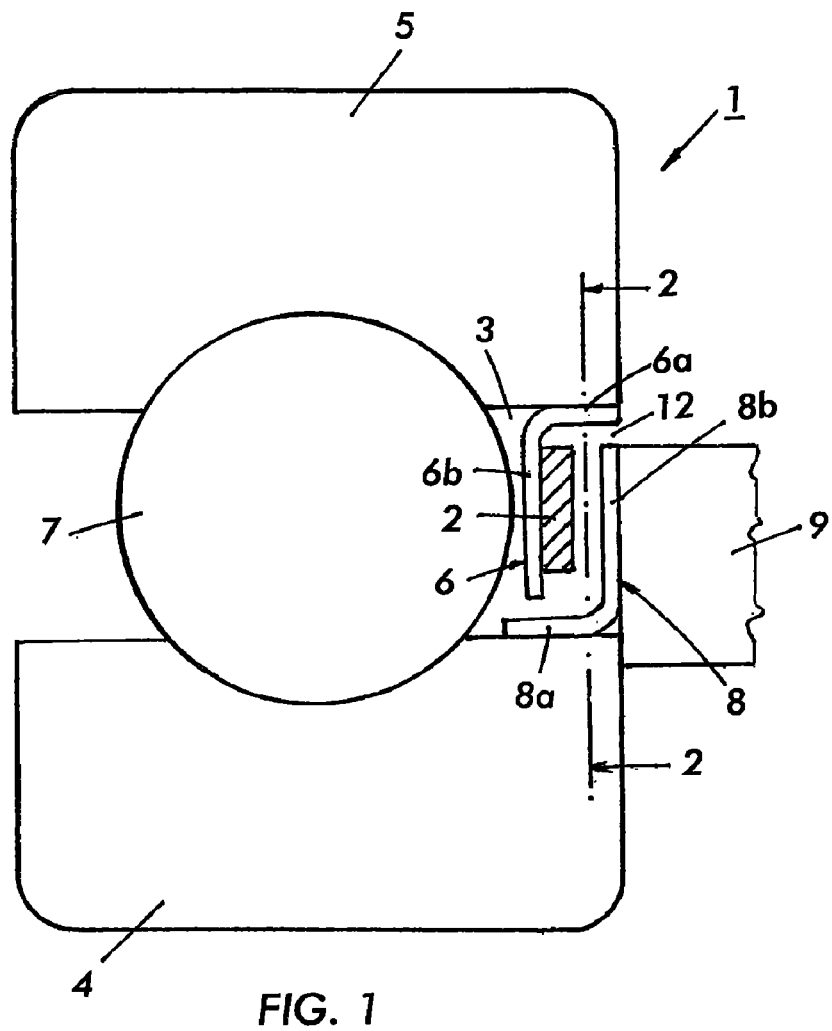
FIG. 1 is a section view of a portion of a wheel bearing arrangement illustrating a portion of the outer part, the inner part, a rolling body and the encoder.

FIG. 1 shows a wheel bearing arrangement 1 in which an encoder 2 is arranged in a radial annular space 3 between an inner part 4 and an outer part 5. The outer part 5 is an outer ring of a ball bearing illustrated only in a schematically simplified form. The inner part 4 is the inner ring of this ball bearing. The encoder 2 is seated on a carrier ring 6 in the form of an angular ring. The carrier ring 6 is seated with a limb 6a on the outer part and limb 6a points away from the rolling bodies 7 of the wheel bearing arrangement 1 or alternatively, as illustrated for example in FIG. 3, points axially toward them. The radially oriented limb is a carrier plate 6b to which the encoder 2 composed of an annular section 2a is fixed.

Figure 2:
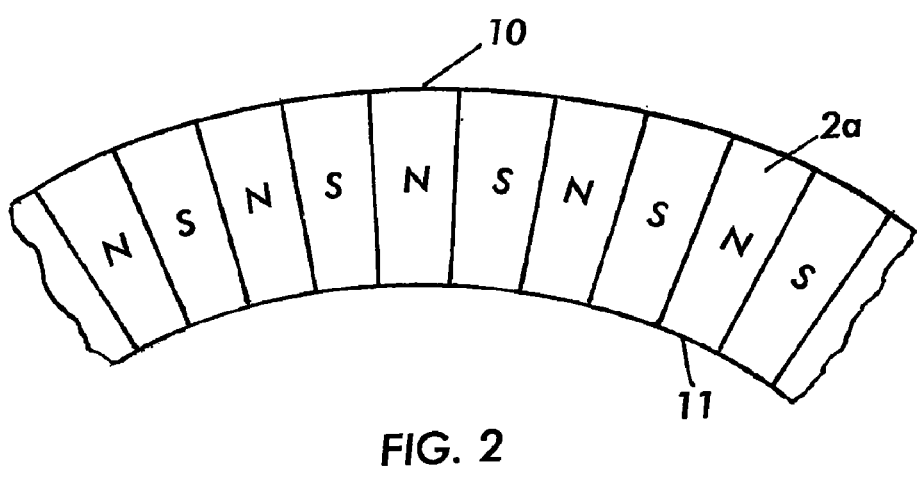
FIG. 2 is an enlarged front view of a detail taken along direction 2-2 of FIG. 1 and illustrates a portion of the encoder.
Figure 3:
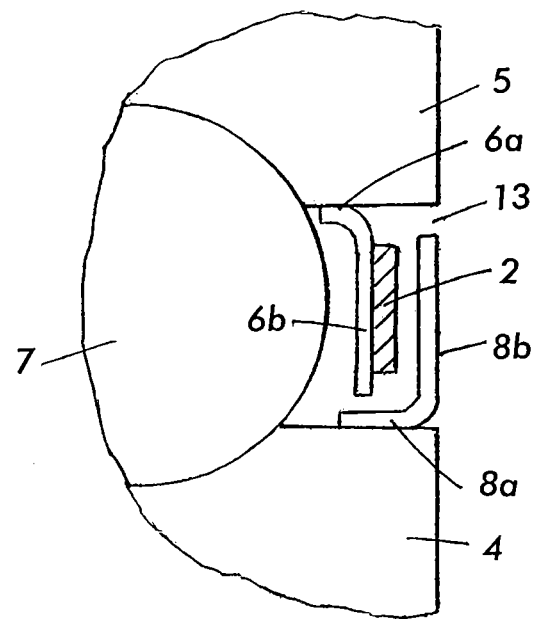
FIG. 3 is a section view showing a detail of the annular gap, the encoder and the protective plate.

The encoder 2 has the annular section 2a. The annular section 2a in FIG. 2 is an enlarged detail of a front view in the direction II-II according to the figure and is not illustrated to scale. Sections 2b with north polarization N are adjacent to sections with south polarization S in the circumferential direction of the encoder 2. The circumferential boundaries 10, 11 of the annular section bound the readable part of the encoder 2.

The encoder 2 is followed in the axial direction by a protective ring 8 in the form of an angular ring made of nonmagnetizeable sheet metal. The protective ring 8 is seated fixedly with the axially oriented limb 8a on the inner part 4. The radially oriented limb is a protective plate 8b on which a sensor 9 bears. Since the protective plate 8b cannot be magnetized, it is possible to use the sensor 9 to read the signals of the encoder 2 through the protective ring 8. The inner part 4, the protective plate 8b and the sensor 9 are fixed to the vehicle. The outer part 5 is rotationally moveable with the encoder 2.

Figure 4A:
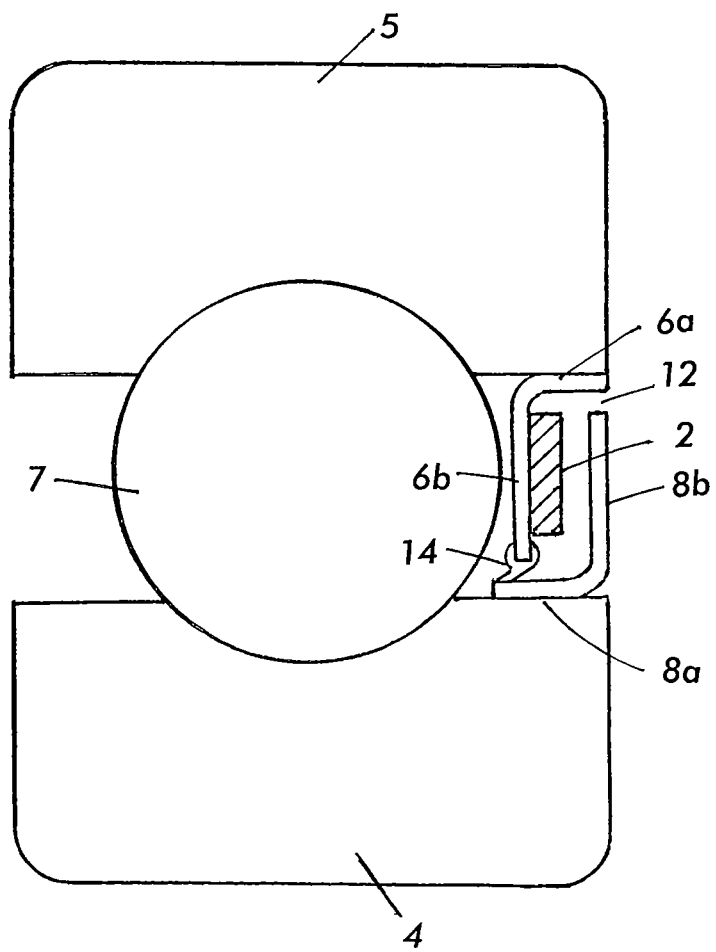
FIG. 4a is a section view of a portion of a wheel bearing arrangement illustrating an elastic sealing lip.
Figure 4B:
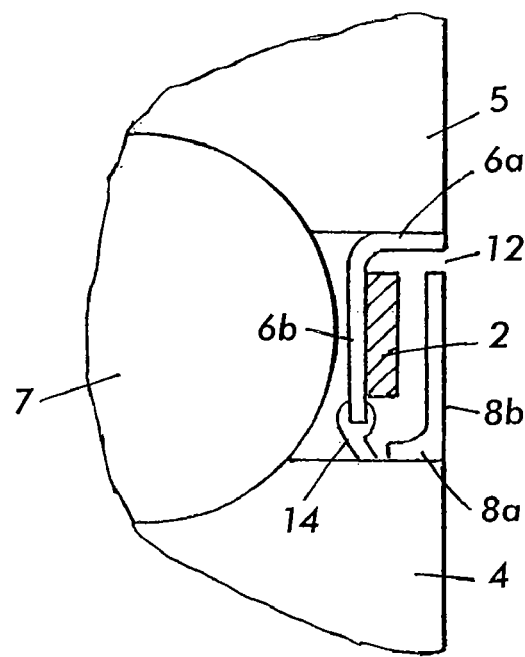
FIG. 4b is a section view showing a portion of the wheel bearing arrangement with the elastic lip bearing against the inner part.

A radial annular gap 12 is formed between the protective plate 8b and the limb 6a in each of the illustrations according to FIG. 1, FIG. 4a and FIG. 4b. An annular gap 13 is formed between the protective plate 8b and the outer part 5 in the illustration according to FIG. 3. Otherwise, the annular space 3 is covered axially by the protective plate 8b.

FIG. 4a shows a wheel bearing arrangement according to claim 1 in which the encoder 2 is fixed to the carrier plate 6b, and also at least one elastic sealing lip 14 is fixed. The elastic sealing lip 14 is directed toward the inner part 4 and extends in a seal-forming fashion on the limb 8a. The sealing lip 14 seals the annular space 3 so as to prevent lubrication grease from escaping from the annular space 3. The encoder 2 with the carrier ring 6 can firstly be pressed as a single assembly into the outer part 5. Owing to the orientation of the sealing lip toward the inside, it is possible subsequently to push the limb 8a under the sealing lip 14. In the arrangement according to FIG. 4b, separate mounting is also conceivable. Since the sealing lip 14 rests directly on the inner part 4, and as a result the protective ring 8 can be mounted independently of the carrier ring 6. The sealing lip 14 seals off the annular space 3 so as to prevent the ingress of moisture and dirt from the surroundings of the wheel bearing arrangement 1 by virtue of the orientation of said sealing lip 14 in the arrangement 4.

Figure 4C:
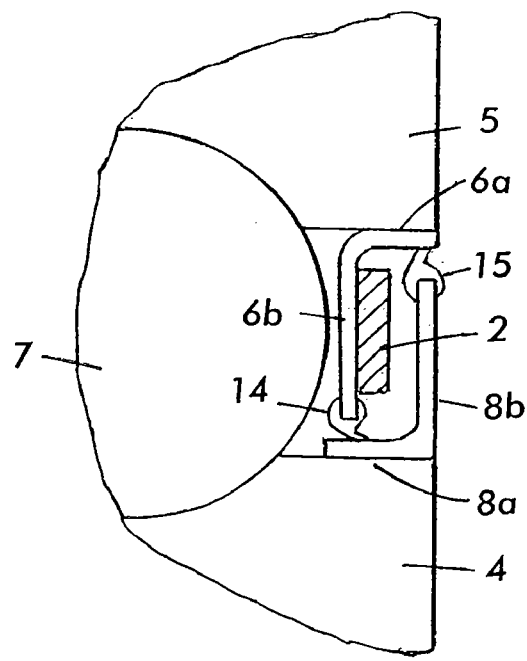
FIG. 4c is a section view illustrating a portion of the wheel bearing arrangement with the elastic lip bearing against a limb of the protective plate and a second sealing lip positioned on the protective plate.
Figure 4D:
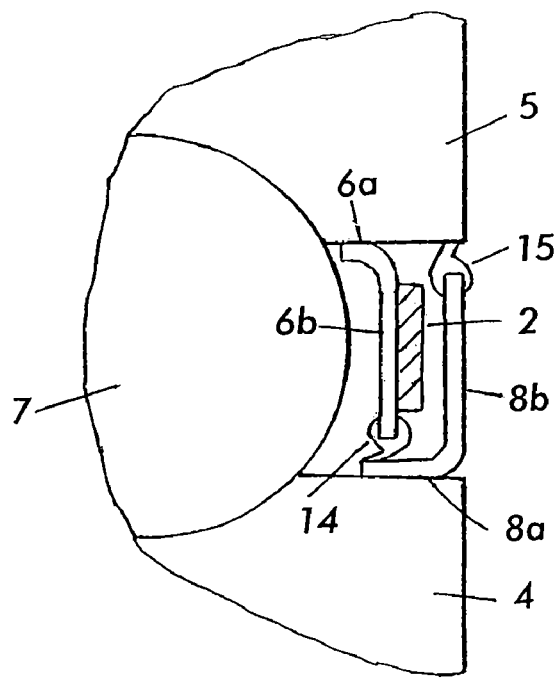
FIG. 4d is a section view illustrating a portion of the wheel bearing arrangement with the elastic lip bearing against the inner part and a second sealing lip positioned on the protective plate bearing against the outer part.

In the arrangements according to FIG. 4c and FIG. 4d, the carrier plate 6b is provided with a sealing lip 14 and the protective plate 8b is provided with a sealing lip 15. In the arrangement according to FIG. 4c, the sealing lip 15 bears radially against the limb 6a, and in the arrangement according to FIG. 4d it bears radially directly on the outer part 5. The arrangement according to FIG. 4d is preferably used as a cartridge arrangement, i.e. it is a premounted unit composed of the carrier ring 6 with encoder 2 and seal 14 and composed of the protective ring 8 with seal 15 between the outer part 5 and the inner part 4.

Figure 4E:
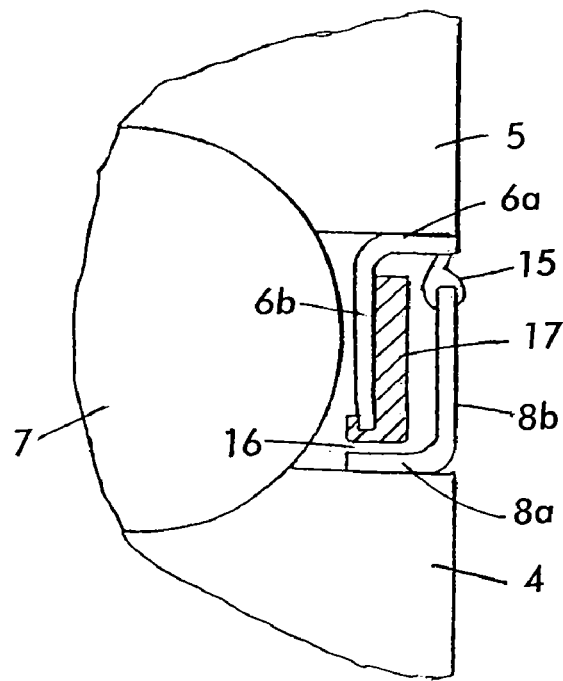
FIG. 4e is a section view illustrating a portion of the wheel bearing arrangement with a sealing lip positioned on the protective plate and bearing against the outer part.
Figure 5:
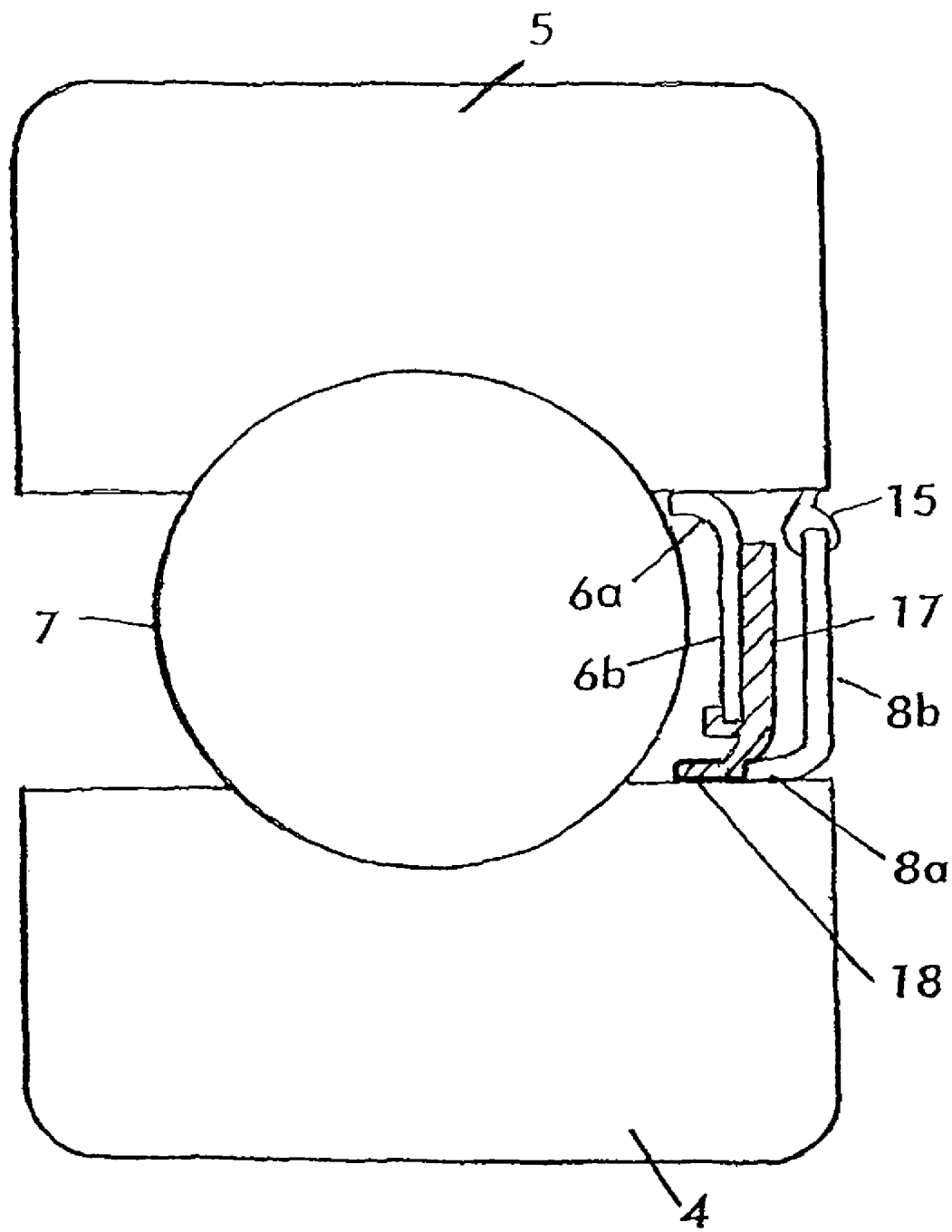
FIG. 5 is a section view of a wheel bearing arrangement with a sealing lip positioned at a distal end of the encoder and also showing a second sealing lip positioned on the protective plate.
Figure 6A:
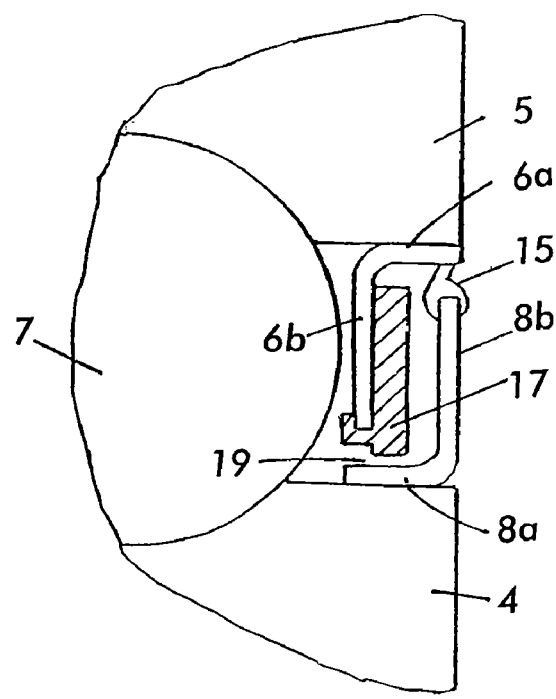
FIG. 6a is a section view of a portion of the wheel bearing arrangement with an annular sealing gap between the encoder and a limb of the protective plate and a sealing lip positioned on the protective plate.
Figure 6B:
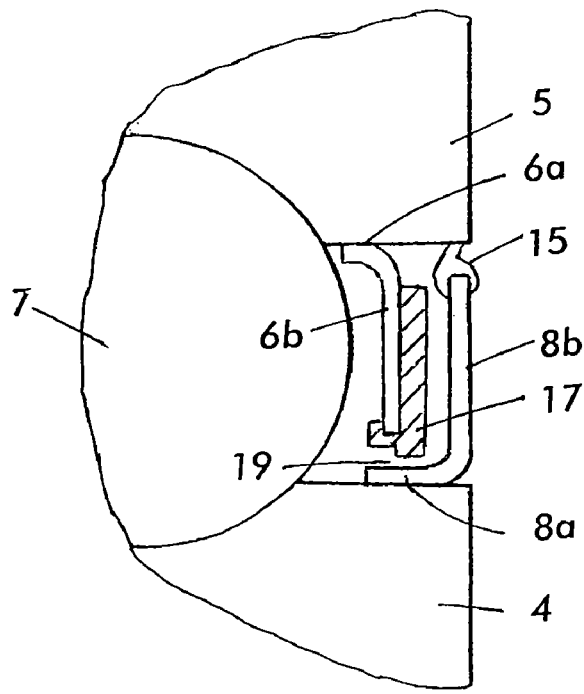
FIG. 6b illustrates the wheel bearing arrangement showing FIG. 6a with the sealing lip positioned on the protective plate bearing against the outer part.

In the arrangements according to FIGS. 4e, 5 and 6, the elastic material of an encoder 17 continues into a sealing element. In the arrangement according to FIG. 4e, a defined sealing gap 16 is provided between an encoder 17 and the limb 8a. In the illustration according to FIG. 5, a sealing lip 18 is formed in one piece with the encoder 17, said sealing lip 18 bearing radially. This sealing lip 18 can be provided with the magnetizeable additives. If the sealing lip 18 is provided with the magnetizeable additives, it will have worn selectively after a predetermined operating period in such a way that, as illustrated in FIGS. 6*a, b*, an optimum minimum annular sealing gap 19 is formed between the encoder 17 and the limb 8*a*.

The invention claimed is:

1. A wheel bearing arrangement comprising:
   a rotationally fixed inner part;
   an outer part positioned radially outward of the inner part and rotationally movable with respect to the inner part about a rotational axis, a radial annular space between the inner part and the outer part;
   an encoder positioned in the radial annular space and configured to be rotationally movable with the outer part about the inner part, the encoder comprising an annular section and having a distal end facing the inner part and positioned directed axially toward a sensor for detecting a rotation of the encoder;
   a protective plate positioned between the encoder and the sensor to at least partially cover in an axial direction the annular space; and
   an elastic sealing lip positioned at the distal end of the encoder and including magnetizeable additives,
   wherein the elastic sealing lip comprises alternately polarized magnetic particles dispersed through the sealing lip.

2. The wheel bearing arrangement as claimed in claim 1, further comprising a carrier plate positioned on the outer part, and an inner ring positioned on the inner part, wherein the encoder is fixed to the carrier plate, and the protective plate is fixed to the inner ring.

3. The wheel bearing arrangement as claimed in claim 1, further comprising a carrier plate,
   wherein the annular section of the encoder has north-south polarization in alternating sequence in the circumferential direction about the rotational axis, and the annular section is fixed to the carrier plate and is directed axially toward the sensor,
   wherein the protective plate comprises a nonmagnetizeable material.

4. The wheel bearing arrangement as claimed in claim 3, further comprising the sensor, wherein the sensor bears axially without gaps against the protective plate.

5. The wheel bearing arrangement as claimed in claim 1, further comprising a carrier plate,
   wherein the encoder is fixed to the carrier plate.

6. The wheel bearing as claimed in claim 1, wherein the sealing lip bears prestressed with respect to the inner part.

7. The wheel bearing arrangement as claimed in claim 1, further comprising an annular sealing gap positioned between the inner part and the sealing lip.

8. The wheel bearing arrangement as claimed in claim 1, further comprising an outer part-oriented sealing lip fixed to the protective plate, the outer part-oriented sealing lip being directed toward the outer part.

* * * * *